United States Patent [19]
Hutchinson

[11] 3,912,062
[45] Oct. 14, 1975

[54] SWITCHING MEANS FOR CONVEYOR SYSTEM AND METHOD OF MANUFACTURE

[76] Inventor: Jesse B. Hutchinson, 4031 Inwood Road, Dallas, Tex. 75209

[22] Filed: May 20, 1974

[21] Appl. No.: 471,180

[52] U.S. Cl. ................................................. 193/36
[51] Int. Cl.² ...................................... B65G 13/10
[58] Field of Search ............................... 193/36, 35

[56] References Cited
UNITED STATES PATENTS

| | | | |
|---|---|---|---|
| 2,613,790 | 10/1952 | Schottelkotte | 193/36 |
| 2,669,334 | 2/1954 | Metzgar | 193/36 |
| 3,103,271 | 9/1963 | Christiansen | 193/36 X |
| 3,785,469 | 1/1974 | Stumpf | 193/36 |

FOREIGN PATENTS OR APPLICATIONS

| | | | |
|---|---|---|---|
| 1,282,551 | 11/1968 | Germany | 193/36 |
| 1,417,770 | 10/1965 | France | 193/36 |

*Primary Examiner*—Evon C. Blunk
*Assistant Examiner*—James L. Rowland
*Attorney, Agent, or Firm*—Wm. T. Wofford

[57] ABSTRACT

Method and apparatus for conveying freight at a predetermined angle characterized by a frame carrying a plurality of pivotally mounted units of rollers having a shifting means for pivoting the respective axle axes of the units of rollers through different degrees to effect a necessary differential degrees of steering in both columns and rows for controlling the direction of movement of the article. The shifting means includes a rigid master shifter lever that is pivotally mounted near the entry end of the frame; a plurality of respective rigid master row links for connecting the master shifter lever with radially outer ends of respective rigid radial arms that are connected with the respective units of rollers at respective predetermined angles. The respective combinations of radial arm lengths and the predetermined angles of connection with the units of rollers are critical to obtaining the necessary differential degrees of steering, or pivotal movement. Disclosed is one method of empirically determining a critical combination of radial arm lengths, angles of connection with the units of rollers, and interconnection of the radial arms with the master row links. Also disclosed are specific apparatus and method steps for effecting the invention.

14 Claims, 17 Drawing Figures

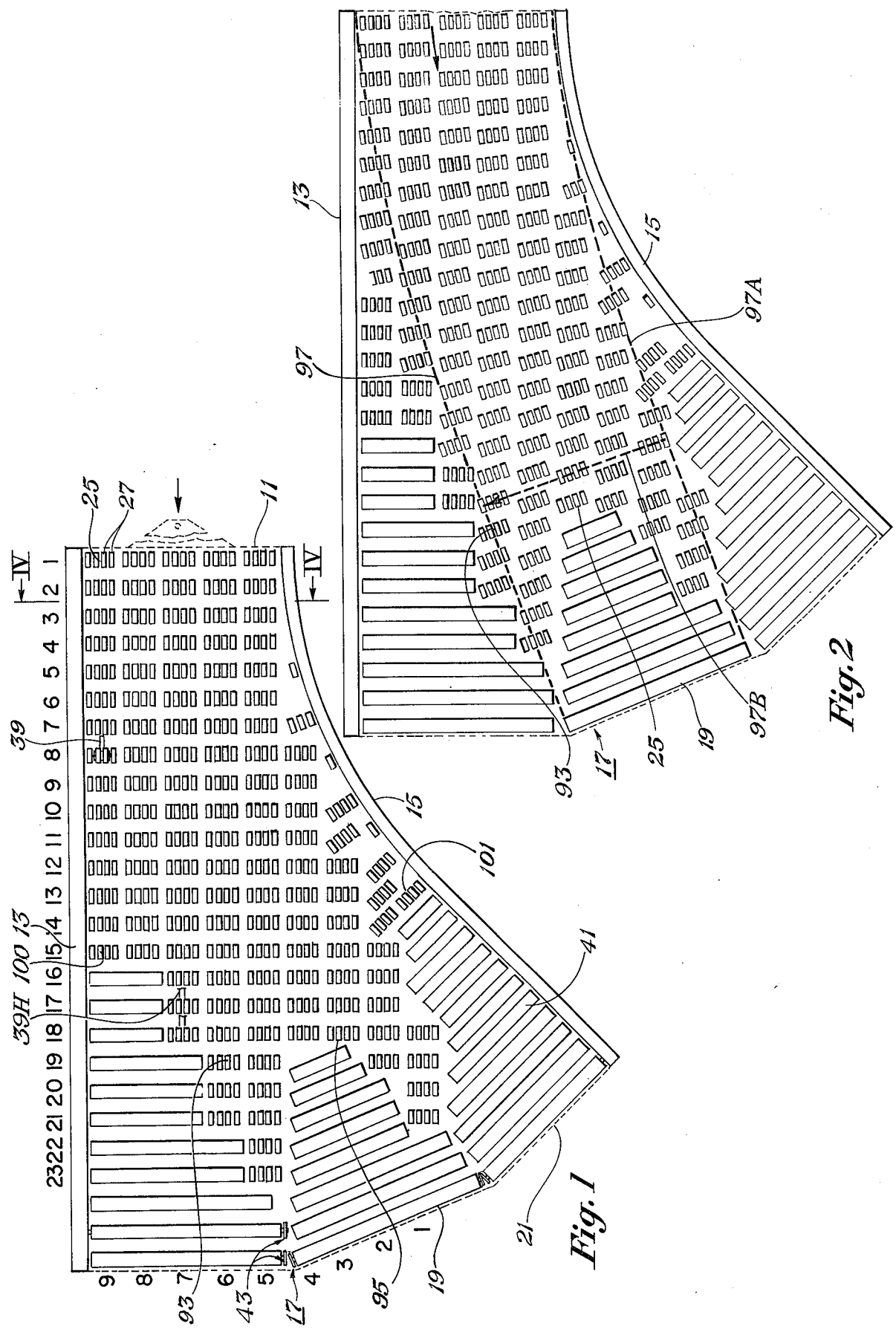

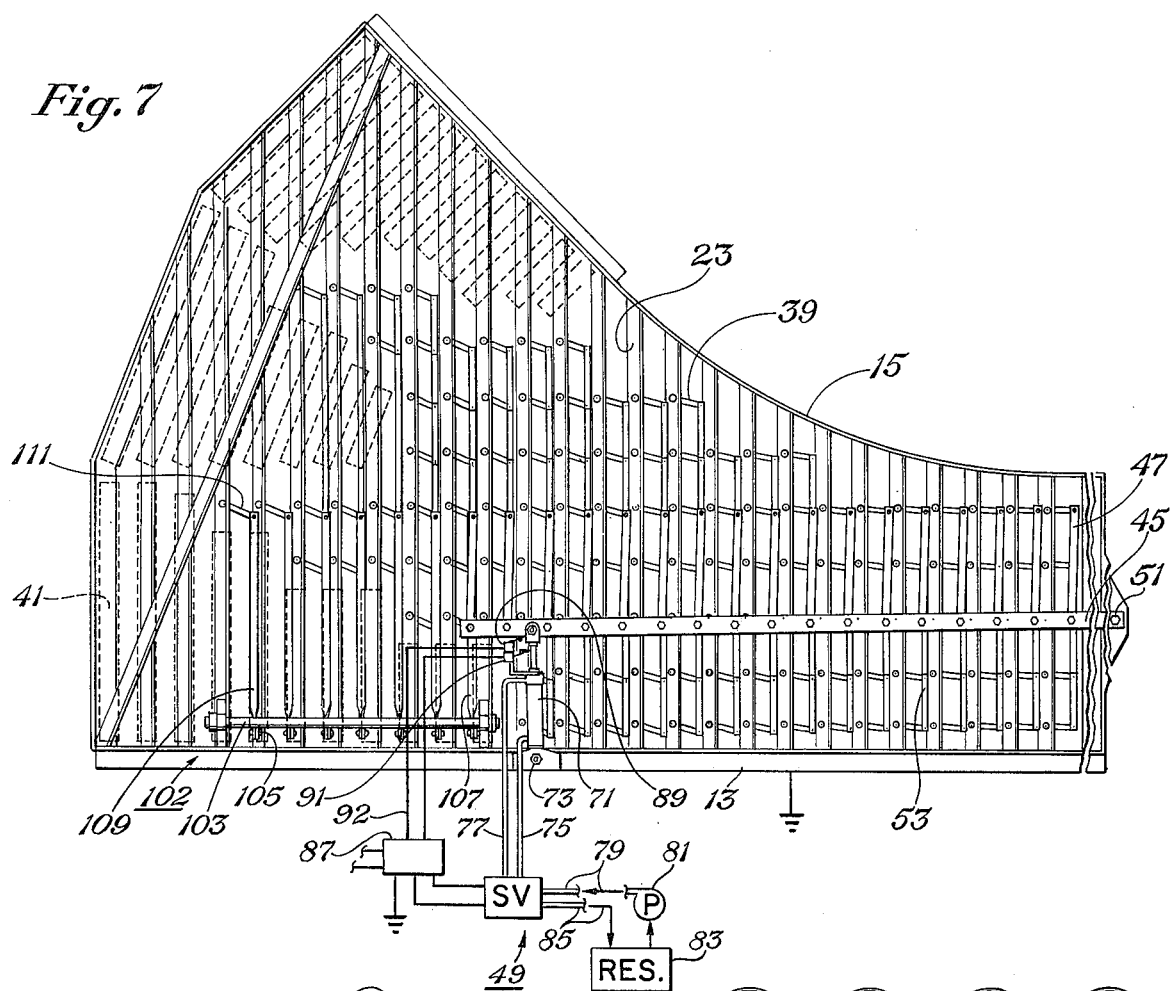
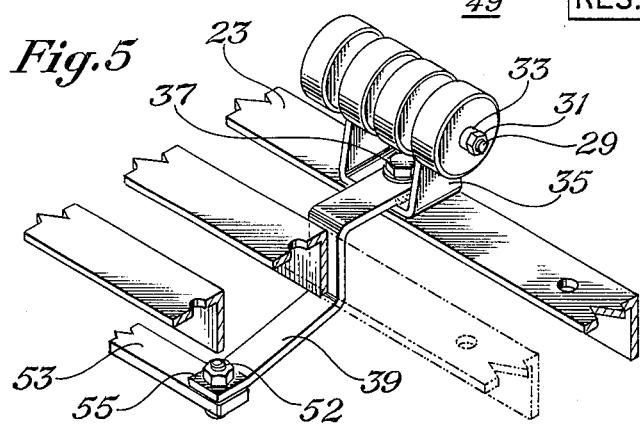
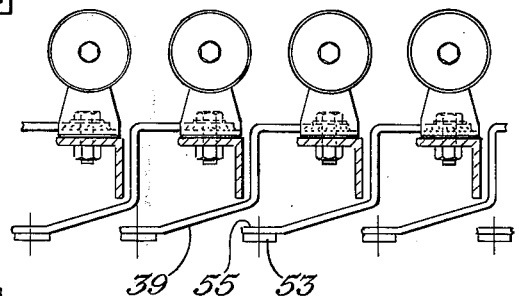
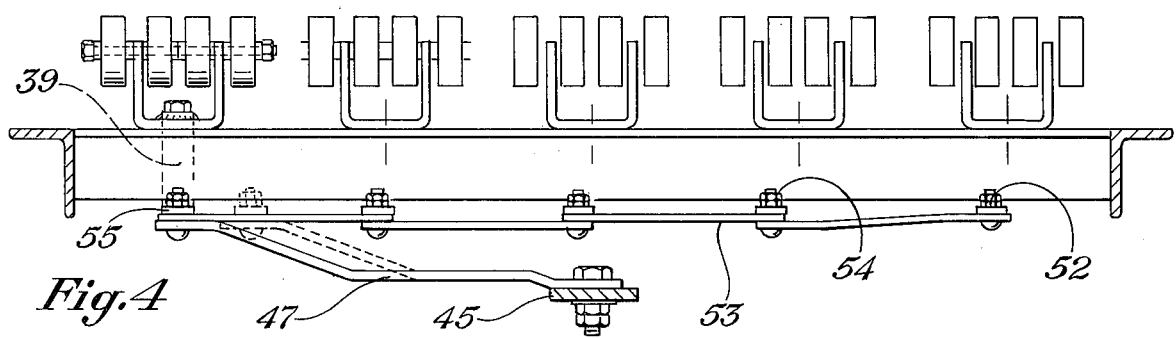

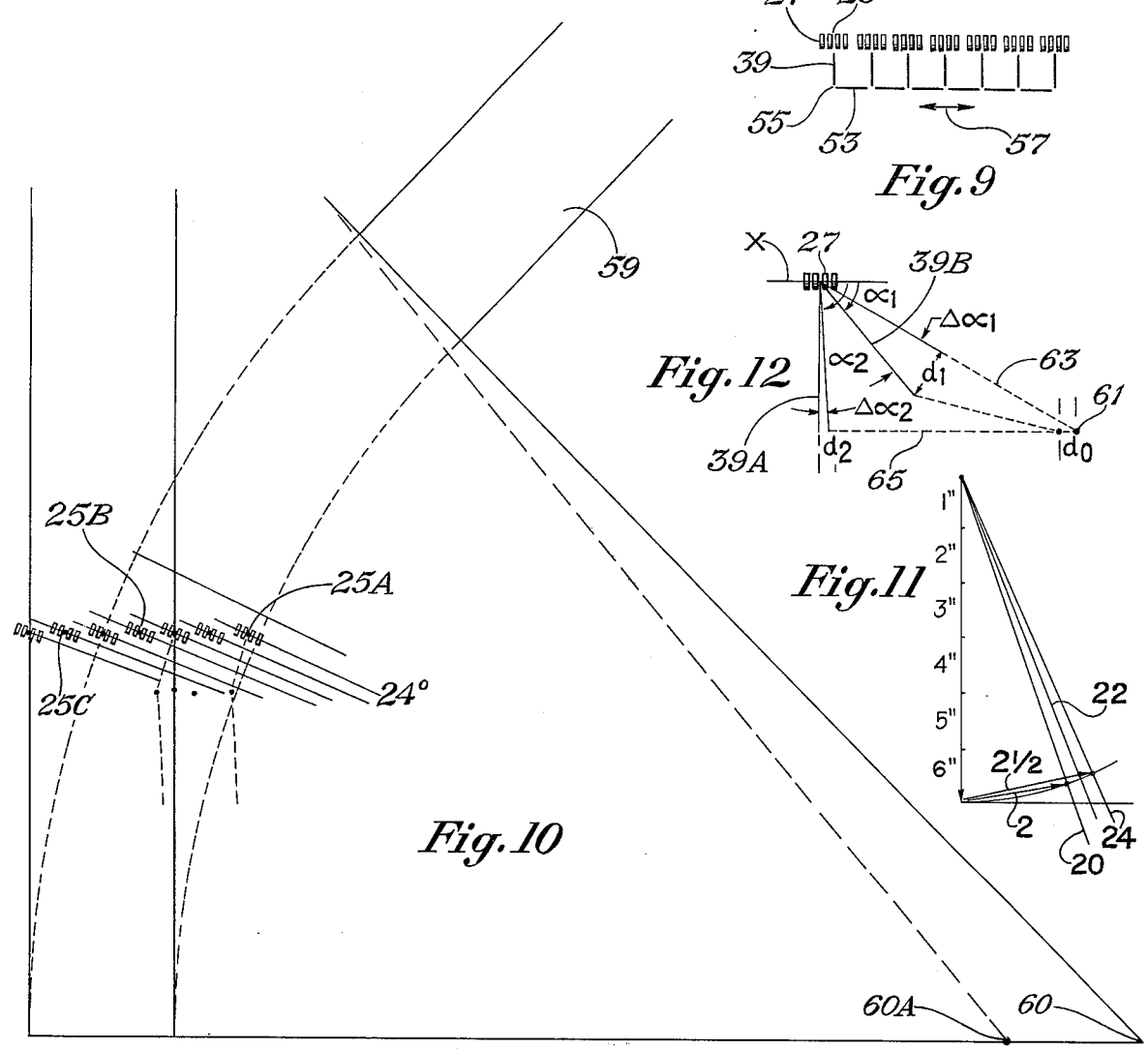
Fig.9
Fig.12
Fig.11
Fig.10
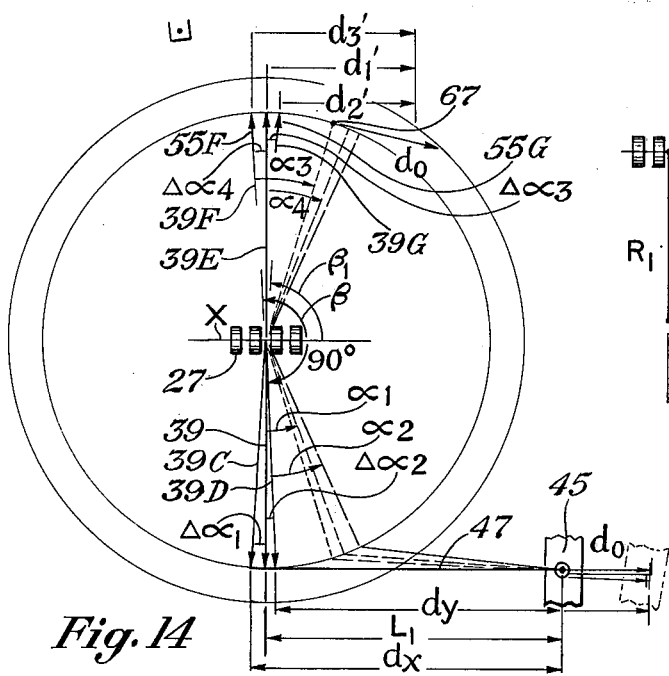
Fig.14
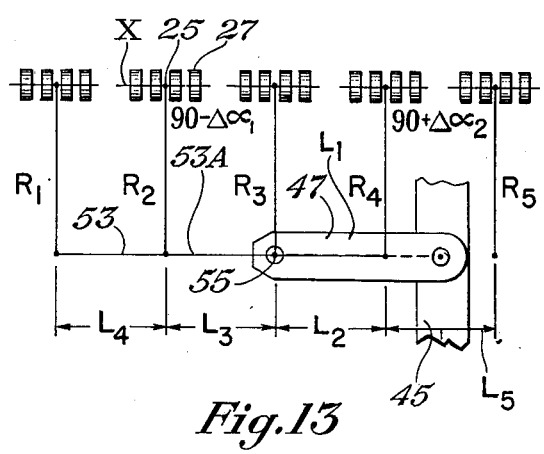
Fig.13

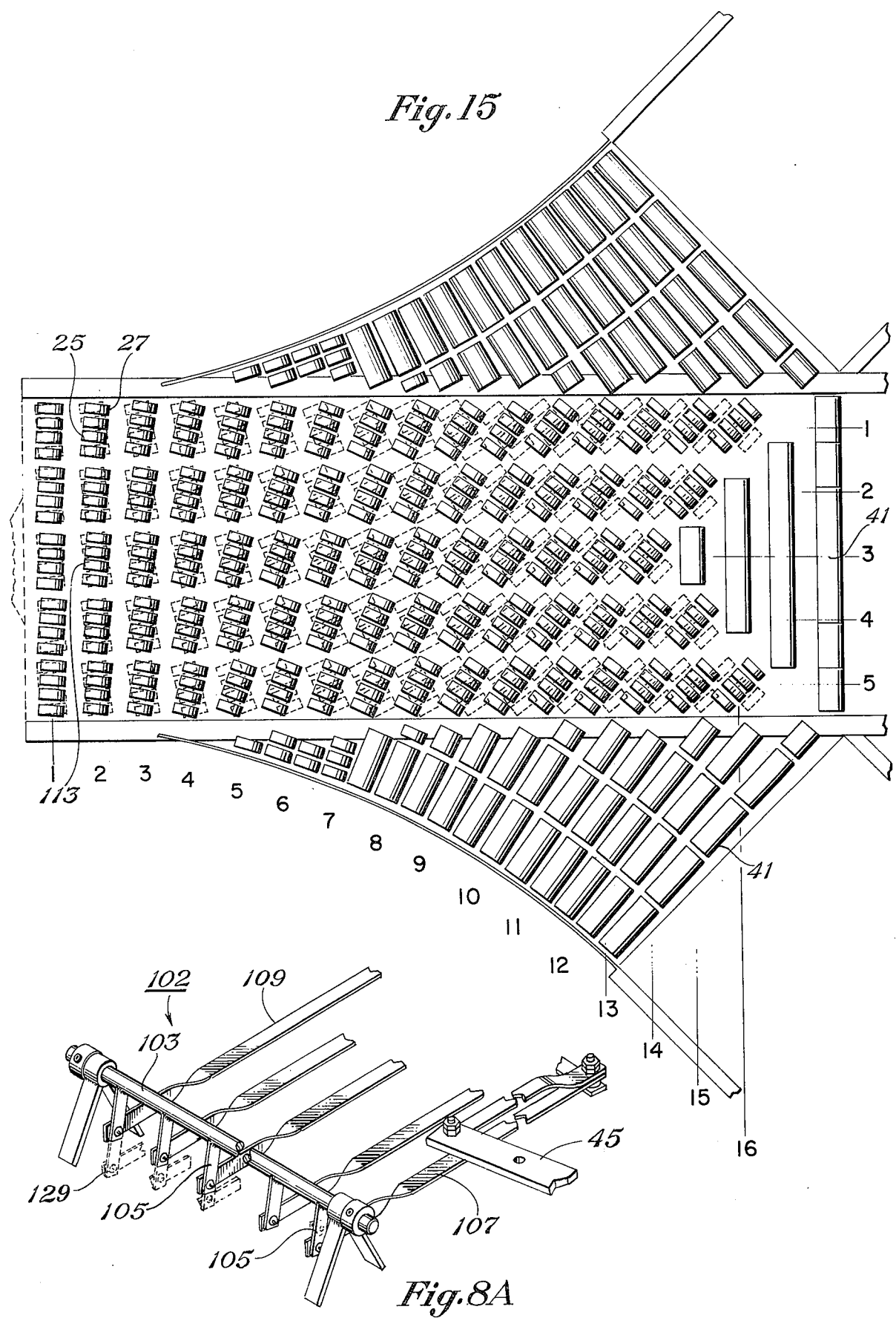

SWITCHING MEANS FOR CONVEYOR SYSTEM AND METHOD OF MANUFACTURE

BACKGROUND OF THE INVENTION

1. Field of the Invention

This invention relates to a switching means for determining the course articles will take when travelling on a conveyor system at a point where the conveyor branches. More particularly, this invention relates to a switching means, or apparatus; and a method for its manufacture.

2. Description of the Prior Art

The prior art is replete with numerous approaches to switching means for use in conveyor systems. These are known by several other names, such as "diverter units," or "multi-path feeders." Typical of such conveyor systems are those described in U.S. Pat. Nos. 3,327,836 and 3,642,117. Typical of the different approaches to the different switching means are those described in U.S. Pat. Nos. 2,257,937; 2,613,790; 2,751,057; 2,759,585; 2,985,274; 3,058,565; 3,254,752; 3,272,298; and 3,370,685. Of all these patents, the one that appears most pertinent is U.S. Pat. No. 2,613,790. This patent describes a plurality of individual rollers pivotally mounted for conveyance in a desired direction responsive to pivotal movement of a lever. The rollers varied in their pivotal movement in columns only but were the same in each row.

None of the apparatus of the prior art has been completely satisfactory in effecting switching of rapidly moving articles onto a plurality of paths in a conveyor system; or having switching means that can be rapidly and accurately controlled from a remote console so as to guide several items through a series of switching means in close sequence. Experience over several years has delineated the following features as being necessary and desirable in a satisfactory switching means for a conveyor system for rapidly moving articles; for example, articles at speeds up to 10 miles per hour, or more.

1. The switching means should have the rollers mounted firmly onto a frame, since this construction is advantageous over changing levels with a plurality of prepositioned rollers, particularly when conveying heavy articles.

2. The switching means should employ a plurality of rollers in each pivotally mounted unit. This obviates the necessity of having too many individually pivotally mounted rollers, yet also overcomes the objection of having elongate cylindrical rollers. When the latter are pivoted, some portion must slide with respect to contact on the container because of the different distances the radially interior portion must rotate with respect to the radially exterior portion. The term "radial" is used in this context to mean a radial in the direction of turn; for example, a radial from a common point in a 45° turn to the right. The plurality of rollers should not be so great that each unit has so much inertia that it resists rapid pivoting.

3. The switching means should employ respective units of rollers that pivot different degrees such that their respective axes coincide with respective radials from a common point in order to satisfactorily change the orientation of a rapidly moving article and cause it to move on to a different path from the straight ahead path.

4. The pivotally mounted units of rollers must turn different degrees in both rows and columns; not merely columns alone. A rigid master shifter lever that is pivotally mounted will effect the different degrees of pivot of the respective rows radially outwardly from the lever's pivot point, as described in U.S. Pat. No. 2,613,790; but fails to effect different degrees of pivot in a given row.

5. Moreover, the different degrees of pivot of the respective units of rollers must be responsive to a rigid master shifter lever without inhibiting degrees of pivot of an adjacent unit of rollers.

6. I have found it preferable that at least the outer rollers in a particular directional turn be pivoted an additional 3°–5° in order to offset the tendency of rapidly moving articles to skid in travelling in a turn.

7. It is desirable to be able to employ as much standardization as possible, hence the largest number of standardized arms and links are employed for respective radial arms and angle-determining links as is feasible with a given type and degree of switching means.

8. It is also desirable that a simple and relatively standard method of manufacture be provided with a predetermined layout so as to enable assembly by less skilled workers.

Accordingly, it is an object of this invention to provide a switching means and a method for manufacture thereof that effects one or more of the foregoing features not heretofore provided by the prior art.

It is another object of this invention to provide a switching means and a method of manufacture that provides a majority of the foregoing features not heretofore provided by the prior art and alleviate the difficulties of the prior art.

These and other objects will become apparent from the following descriptive matter, particularly when taken in conjunction with the drawings.

BRIEF DESCRIPTION OF THE DRAWINGS

FIG. 1 is a top plan view of a switching means for switching articles to the left at respective angles of 22½° and 45° in accordance with one embodiment of this invention; the switching means being shown in the position to deliver an article straight ahead and being simplified for clarity.

FIG. 2 is a top plan view of the switching means of FIG. 1 shown in a position to effect switching, or directing, an article onto the exit rollers making a 22½° turn to the left.

FIG. 4 is a partial cross sectional view of a row of units of rollers taken along the line IV—IV of FIG. 1.

FIG. 5 is a partial isometric view of a radial arm connected with a unit of rollers at a critical angle determined by an angle-determining linkage, in accordance with the embodiment of FIG. 1.

FIG. 6 is a side elevational view of a plurality of rows of units of rollers like FIG. 5.

FIG. 7 is a bottom plan view, partly schematic, showing a moving means and the rear of the embodiment of FIG. 2.

FIG. 8A is a partial isometric view of the auxiliary shifter of FIG. 8.

FIG. 9 is a schematic plan view of a row of units of rollers with their radial arms and angle-determining links simplified for explanation purposes.

FIG. 10 is a simplified schematic view of an embodiment illustrating diagrammatically the different degrees of turn effected by the rollers to maintain axle alignment with radials from a common point at least near the center of turn in accordance with this invention.

FIG. 11 illustrates diagrammatically the different distances the end of a radial arm is required to move to effect the different degrees of turn of the units of rollers of FIG. 10.

FIG. 12 illustrates diagrammatically how the different distances of movement of the ends of a radial arm can be effected by the same lateral movement of a master shifter lever.

FIG. 13 is a plan schematic view showing generically for discussion purpose a simplified symmetrical embodiment of this invention for effecting the different degrees of pivotal movement of the units of rollers in a given row.

FIG. 14 illustrates diagrammatically practical placement of a radial arm with respect to a predetermined radial arm for effecting the different degrees of pivotal movement of the units of rollers in a given row in accordance with an embodiment of this invention.

FIG. 15 is a plan view of another embodiment of this invention for effecting switching of articles to both the left and the right.

DESCRIPTION OF PREFERRED EMBODIMENTS

Figure 3:
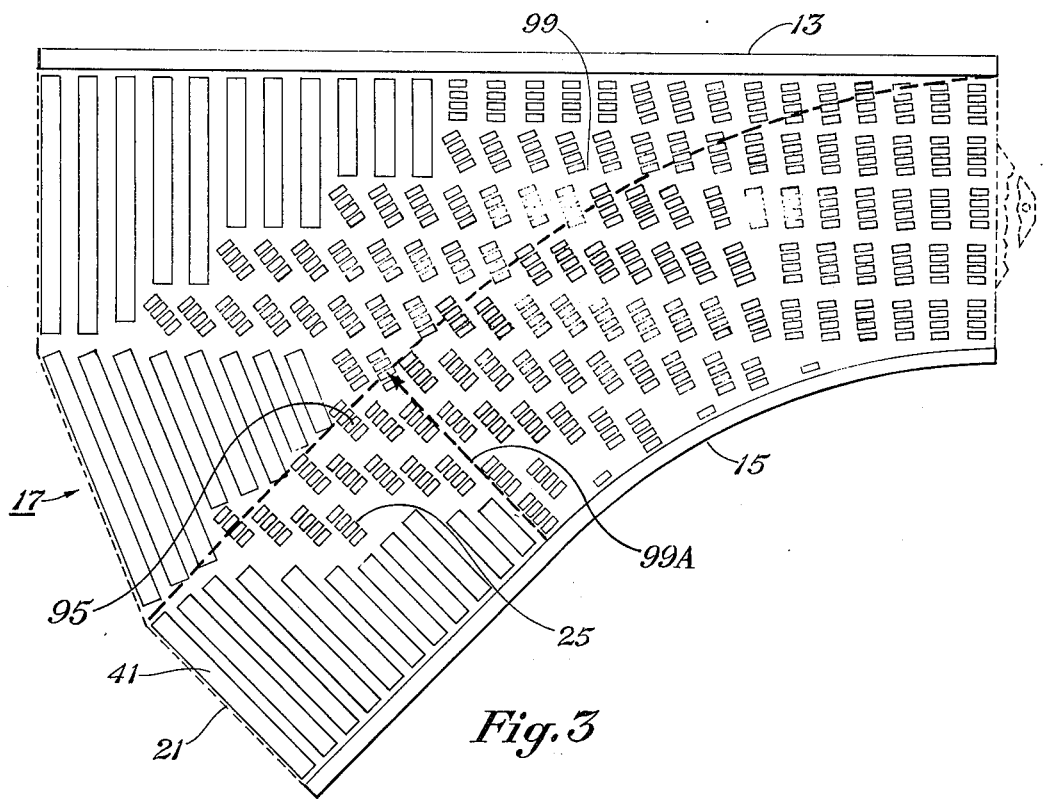
FIG. 3 is a top plan view of the switching means of FIG. 1 shown in a position for switching an article onto the rollers making a 45° turn to the left.

The switching means illustrated and described herein is used in connection with almost any complexity conveyor system; for example, for conveying articles from an unloading point to a plurality of destinations in a truck terminal or warehouse or, conversely, from the plurality of locations in the warehouse to a loading dock. Overall systems are not new, per se, and range from simple to relatively complex. Consequently, only the switching means is described and claimed herein. This switching means is employed in conjunction with a conveyor section that delivers articles to the switching means and a plurality of other conveyor sections that receive the articles at a plurality of exits and carry them away. By this simple means, any desirable system can be built up with each of the switching means operable in response to suitable means, such as manual switching or a control switch in the master control panel, or station. For example, delivery to or from any one of 27 possible destinations may be effected by properly interconnected conveyor sections, switching means, three banks of three switches each with an operator to operate the switches for effecting operation of the respective switching means remotely. The respective conveyor sections that deliver and carry away the articles, similarly as with the overall system, are well known, do not constitute limitations on this invention, and are not illustrated in the drawings. Such sections may be visualized, for example, as roller conveyor sections of conventional design employing gravity to maintain the flow of articles thereover. Of course, powered sections may be employed as necessary to effect the different levels in order to most expeditiously employ the effects of gravity for movement of the articles along the conveyor sections.

Referring to FIG. 1, the switching device has, forming an overall frame, a front frame member 11, side rail members 13 and 15 and a rear frame member 17. As illustrated in FIG. 1, side rail member 13 is straight, whereas side rail member 15 is curved to the left to accommodate a redirecting, or switching, of an object up to 45° to the left. The rear frame member 17 has a main section that parallels the front frame member 11 and has angularly related sections 19 and 21 that define exit conveyors at, respectively, 22½° and 45° to the left. An entering conveyor section (not shown) may be juxtaposed, or fastened, to the front frame member 11. Similarly, respective leaving conveyor sections may be juxtaposed, or fastened, to the main section or rear member 17, to the 22½° exit section 19 or to the 45° exit section 21. The fastening may be by means of C-clamps, U-bolts or coengaging brackets as desired. A plurality of members 23, FIG. 7, such as angle iron, extend laterally of the frame and are connected, as by bolting or welding, with the respective side rail members 13 and 15. The laterally extending members 23 support respective units 25 of rollers, yet facilitate assembly with radial arms 39, FIGS. 4–7, extending below the top of the frame, as will become apparent from descriptive matter later hereinafter.

The overall frame may be mounted on its own supports as by way of a structural frame therebeneath with or without legs and rollers for portability or connected to a structural support carrying the remainder of the conveyor system, for example, suspended from building structure.

At the entrance end and disposed along the respective directions in which an article is to be directed, are a plurality of units 25 of rollers, FIG. 1. Each of the units of rollers contain a plurality of individual rollers mounted on a single axle. As illustrated, each unit 25 contains four rollers 27 rotatably mounted on a single axle 29, FIG. 5. Each axle has locking nuts 31 at one end. Each of the rollers 27 are mounted on the axle 29 by ball bearings. Integral spacers 33 may be employed with the rollers or individually mounted on the axle 29. The respective units 25 of rollers 27 have their axles 29 supported in a clevis 35 that is pivotally mounted on the member 23, as by way of nut and bolt 37. A radial arm 39 is connected with each clevis 35 at a predetermined angle for effecting the improved results of this invention, as will be described in more detail hereinafter. The radial arms may extend toward or away from the front frame member 11. As illustrated herein, they extend toward the front frame member 11 when the units 25 of rollers 27 are in the straight ahead position.

A plurality of cylindrical rollers 41, FIG. 1, are rotatably mounted by suitable means, such as, axles journalled in brackets (only one axle and bracket 43 being shown in the interest of simplification) and in the respective side rails 13 and 15. The cylindrical rollers 41 are employed where there is no differential degree of rotation between the ends of the roller, as where an object is moving in a straight line when it encounters the roller. The top of the respective rollers and cylindrical rollers are co-planar. The side rails 13 and 15 do not extend above the co-planar tops of the respective rollers and cylindrical rollers.

As noted in U.S. Pat. No. 2,613,790, an article moving along a conveyor and encountering supporting rollers having axes of rotation not perpendicular to its direction of motion but otherwise angled with respect to that direction in a horizontal plane will be diverted thereby to the right or the left; and if the article is to move smoothly in a curved path successive sets of shiftable rollers, as in a column, must have their axes shifted through progressively increasing angles. In addition, it has been found that when articles are travelling at a high rate of speed, for example, about 10 miles per hour (mph) or more, it is also necessary to have units of rollers have their respective axle axes aligned with radials from a common center adjacent the center of the arc of the turn. In effect, this means that successive radially interior units 25 of rollers are pivoted through progressively increasing angles, even in a given row; thereby effecting differential degrees of pivotal movement, or differential steering analogous to the Ackerman steering principle. This invention employs all of these basic features, as well as the other features delineated hereinbefore. Specifically, a shifting means is provided that shifts the axes of the units of rollers to smoothly control the direction of movement of a rapidly moving article entering the conveyor and cause it to exit selectively on one of the exit conveyors. The shifting means incorporates, in addition to the respective rigid radial arms, a rigid master shifter lever 45, FIG. 7, a plurality of rigid master row links 47 serving as one of the intermediate connections between the master shifter lever 45 and the radial arms 39, and moving means 49 for moving the master shifter lever.

The rigid master shifter lever 45 is pivotally mounted via a fulcrum shaft 51 on the frame and below the plane of the top of the respective rollers 25 and cylindrical rollers 41 to be out of the way of freight or the like passing thereover. The fulcrum shaft 51 is mounted adjacent the end of the frame that is adapted for juxtaposing adjacent an entering conveyor. Thus, it can be seen that for a given angle of movement, a greater lateral displacement is effected as the radial distance along the rigid master shifter lever increases from the fulcrum shaft 51. In this way, successive rows of units 25 of rollers 27 will have the radial outer ends of their respective rigid radial arms moved laterally for greater distances than the preceding row nearer the fulcrum shaft 51. Also, movement of the master shifter lever 45 will concurrently effect movement of all of the radially outer ends of the respective radial arms that are connected therewith. Consequently, all of the respective units of rollers will be pivoted concurrently on their vertical axes to their respective angles. If the radial arms of units of rollers were connected at the same relative angular connection with the respective units of rollers, the rollers in a given row would be pivoted the same degree, although the degree of pivoting would progressively increase as distances along the rigid master shifter lever increased.

The master shifter lever 45 is connected, respectively, with the radial arms in the respective rows of units of rollers by a plurality of rigid linkages that include the master row links 47. The master row links 47 are pivotally connected with the master shifter lever 45 at predetermined respective radial distances from the fulcrum shaft 51 so as to extend substantially perpendicularly thereto and enable rigid, but free, interconnection with the respective radially outer ends of the respective rigid radial arms 39 in that row.

Figure 8:
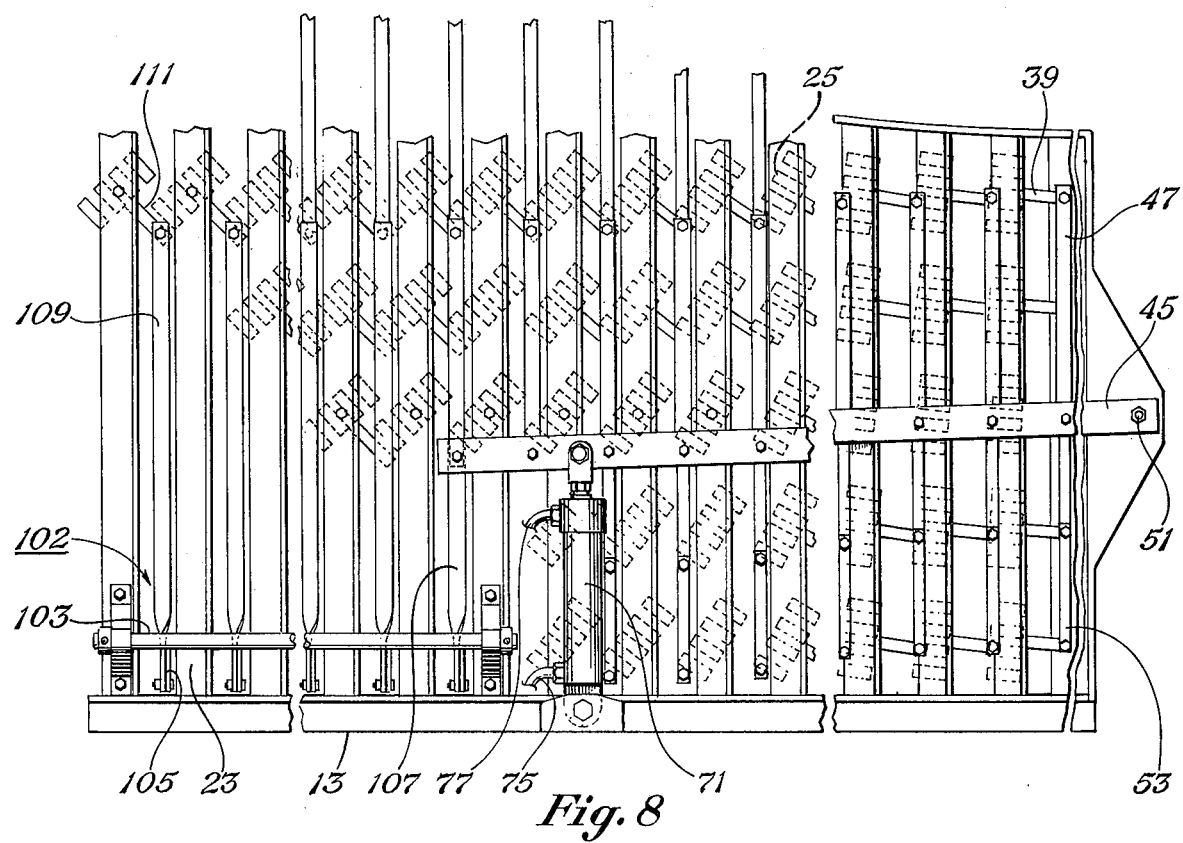
FIG. 8 is a partial bottom view, discontinuous and enlarged for clarity, of the embodiment of FIG. 3.

As illustrated, the plurality of linkages also include individual angle-determining links 53, FIGS. 4, 7 and 8. The ends of the master row links 47 are pivotally connected, respectively, with the master shifter lever 45 and at least one of the angle-determining links 53 somewhere along its length by respective nut and bolt combination 52, FIGS. 4 and 5. Specifically, lock nuts 54 are emplaced on the bolts and nuts to hold the previously drilled or punched ends of the respective links together, yet allow free pivotal movement. The plurality of predetermined rigid angle-determining links 53 are serially connected together in a row and with respective radially outer ends 55 of the radial arms 39. The plurality of discrete predetermined rigid angle-determining links are vital to this embodiment in order to allow free movement of the radial arms regardless of their predetermined angle of attachment, without buckling any other rigid links and without interference with movement of other radial arms in a given row. This is a vital concern if the differential steering is to be effected, as will be described in more detail hereinafter. The determining of the respective predetermined lengths of the respective angle-determining links 53 is subtle and requires extensive empirical analysis as will be described in more detail later hereinafter.

Various moving means may be adapted for controlling the positioning of the master shifter lever 45 and shifting it. This may be done manually or by power means made responsive to an operator or to automatic selecting or sorting means, such as an electric eye. For purposes of illustration, the illustrated moving means 49 comprises a powered ram 71 that is connected with the outer portion of the rigid master shifter lever 45 and pivotally connected with a support 73 on the frame. Suitable high pressure fluid is supplied via one of the respective conduits 75 and 77. The high pressure fluid is supplied through the appropriate conduit by proper positioning of a multi-position solenoid-operated valve SV. High pressure fluid is supplied to the valve via conduit 79 from pump 81. Low pressure fluid is vented to a suitable source; for example, reservoir (RES) 83 if it is a liquid; via conduit 85. Proper operation of the solenoid valve is effected responsive to output from a control switch 87. The control switch 87 moves the multi-position valve SV into neutral to hold a given position, into a position to direct high pressure fluid through conduit 75 to extend the ram and move the outermost end of the master shifter lever 45 upwardly in FIG. 7; or into a position to direct high pressure fluid through conduit 77 to retract the ram and move the outermost end of the master shifter lever 45 downwardly in FIG. 7. The degrees of movement are controlled by respective limit switches 89 and 91 that are positioned at the proper position for effecting the degrees of turn; for example, one at 22½° to the left, and one at 45° to the left. If desired, a limit switch can be employed at the neutral position, also. Thus, closing or opening of the respective limit switches that are serially connected by suitable electrical conductors 92 into the circuit, effect stopping of the movement of the master shifter lever 45 by properly positioning the solenoid valve SV and properly controlling the flow of high pressure fluid to the powered ram 71. The type of moving means is not critical to this invention as is the differential steering, or pivotal movement, of the units of rollers in both columns and rows.

The two major approaches for obtaining the differential steering may be understood more clearly by referring to FIGS. 9–14. FIG. 9 represents schematically, the respective units 25 of rollers 27 connected with respective radial arms 39 whose outer ends 55 are connected by respective individual angle-determining links 53. Since the respective links 53 are rigid, it can be seen that if one of the outer ends 55 is moved laterally, as indicated by arrow 57, all of the ends 55 will be moved laterally in the same direction. FIG. 10 illustrates the different degrees of steering that need to be effected in the respective units 25 of rollers to effect a smooth turn of an object onto an exit conveyor 59 in accordance with this invention. FIG. 10 may be thought of as a view from the bottom of the apparatus of FIG. 1 or as an abstract empirical embodiment illustrating the principle by way of a diversion, or switching, to the right. For example, the radially innermost set of rollers 25A may be required to be rotated through an angle of 24° to have its axle axis aligned with a straight line from a common center 60 serving as the center of an arc defining the illustrated turn through 45°. A center unit of rollers, such as unit 25B, however, may be required to be pivoted through only 22°; whereas the radially outermost unit 25C may be required to be pivoted through only 20°.

As can be seen in FIG. 11, one way of obtaining the differential degrees of steer of the units of rollers is to move the outer end 55 of the radial arms 39 different distances. For example, 20° of steer can be obtained by moving the outer end of a 6 inch radial arm only 2 inches whereas obtaining 24° of steer requires analogous movement of approximately 2½ inches. As will be appreciated, obtaining different degrees of movement of the same length radial arm is difficult to achieve when employing standard length connections with the master shifter lever. If desired, different length radial arms could be adverted to to obtain the differential degrees of steer and this is an embodiment that is deemed to be within the broad concept of this invention. For example, shorter radial arms pivot the units of rollers through a greater number of degrees when their free ends are moved laterally the same distance, as compared with longer radial arms. Any critical combinations of radial arm lengths and predetermined angles of connection with respective units of rollers may be employed as long as the differential steering is effected in both columns and rows, as delineated herein. It has been found easier, however, to employ relative positions, or angles of attachment, of the respective radial arms with their respective units of rollers to obtain the necessary differential steering. This concept can be understood more clearly by referring to FIG. 12. Therein is depicted differential angles of steer effected by the same lateral movement $d_0$ of the end 61 of links, illustrated by dotted lines 63 and 65, attached to two differentially positioned radial arms. The different positions of the radial arms are exaggerated for purposes of illustration. For example, a given radial arm 39A will move through only the angle $\Delta\alpha_2$ if positioned at the angle $\alpha_2$ with respect to the axle axis X of the unit of rollers 27. On the other hand, if a radial arm 39B is positioned at the angle $\alpha_1$, it will be moved through a much greater angle $\Delta\alpha_1$. Also, it can be seen that the distance $d_1$ that the radially outermost end of the radial arm 39B is moved is greater than the distance $d_2$ that the radially outermost end of the radial arm 39A is moved. Thus, it can be seen that by merely positioning the respective radial arm at a predetermined angle with respect to the axle axis of the unit of rollers 27, the desired differential steering may be effected with the same lateral movement; as of a particular point on the master shifter lever 45.

Referring to FIG. 13, it can be seen that the master shifter lever 45 may be moved laterally in either direction and transmit this lateral movement by means of the master row link 47 to the radially outermost end of the radial arm $R_3$ in the control row of units 25 of rollers 27. As noted herein, the radial arm $R_3$ is connected at an angle of 90° with its control unit of rollers. Consequently, its degree of turn is correct for the radial distance outwardly along the radial arm 45. The fulcrum shaft 51, FIG. 7, is displaced outside the entering end of the switching means by a length determined empirically taking into consideration the buildup of slack in the bearings, pivots and parts and the necessary impulse to start the article being switched into a turning movement; for example, a length equal to that of about three radial arms, such as $R_3$, as compensation.

As described hereinbefore, the outer radial arms $R_4$ and $R_5$, FIG. 13, may have a length different from that of the radial arm $R_3$ such that differential degrees of steer are imparted to their respective units 25 of rollers 27. In this embodiment, however, the radial arms have uniform lengths and uniform bends in order to be connected with the respective units 25 of rollers 27 and extend beneath the plane of the surfaces on which the units of rollers are pivotally mounted. In this way, the radially outermost ends of the respective radial arms $R_1$–$R_5$ can be attached with respective angledetermining links 53, having their individual lengths $L_2$, $L_3$, $L_4$ and $L_5$ that have been determined empirically to get the predetermined angle of attachment for effecting the differential degrees of steer.

The empirical determination can be understood more clearly by reference to FIG. 14. Therein, the lower portion of the figure illustrates generically the angle at which a respective radial arm 39 will be attached to the axle axis X of its unit of rollers 27 in order to get the desired angle of steer for that particular unit of rollers and align its axle axis X with the line from the common point 60, FIG. 10. The rigid master shifter lever 45 may be thought of as being moved to the right in FIG. 14 a distance $d_0$. It is connected with the control radial arm by a link having a length $L_1$. Consequently, its unit will be pivoted through an angle $\alpha_1$ by the illustrated movement to the right. If a lesser angle of steer is desired to be imparted to an outer unit of rollers, its radial arm 39C must be positioned to the left of the 90° angle such that it will have an angle of 90+$\Delta\alpha_1$. This may be effected by having a relatively longer link $d_x$, FIG. 14. Conversely, an interior unit of rollers may require a greater angle of pivotal movement. Such an interior unit of rollers will have its radial arm 39D positioned at an angle of 90 −$\Delta\alpha_2$. Thus, it can be seen that the relative distance of connection with the master shifter lever 45 is a distance $d_y$. Consequently, lateral movement of the master shifter lever 45 to the right a distance $d_0$ will pivot the unit connected to the radial arm 39D through a greater angle $\alpha_2$.

This empirical determination is translated onto the schematic FIG. 13 as follows. Assume movement of the master shifter lever 45 to the left to effect a steer and switching to the right similar to that illustrated in FIG.

10 if it be considered a top plan view. The free end 55 of the radial arm $R_3$ will be moved to the left for the desired degree of steer, or pivotal movement for respective row in the control column. A lesser degree of steer is imparted to the unit connected to the radial arm $R_2$. Consequently, the radial arm $R_2$ is connected to its unit of rollers at an angle $90-\Delta\alpha_1$ as measured clockwise from its axle axis X. The angle $90-\Delta\alpha_1$ is effected in a preferred embodiment described in more detail hereinafter by holding the unit in a straight ahead position and connecting the free ends of $R_3$ and $R_2$ via an angle-determining link 53A having a length $L_3$ that is shorter than the lateral distance separating the respective units of rollers. This is invertedly analogous to the position of radial arm 39C, FIG. 14.

Similarly, the radial arm $R_1$ is connected with its unit of rollers at an angle of less than 90°, clockwise from its axle axis. The angle is effected by holding the unit in the straight ahead position and connecting the free ends of $R_2$ and $R_1$ via an angle-determining link 53 having a length $L_4$. The length $L_4$ will have been empirically determined and may be about the same as or longer or shorter than the lateral distance separating the respective units of rollers. Ordinarily, it will be slightly shorter, although this tendency may be compensated for by foreshortening of the arcuate movement of the free end of $R_2$, as discussed hereinafter with respect to FIG. 16.

Conversely, a greater degree of steer, or pivotal movement is imparted via radial arm $R_4$. Consequently, the radial arm $R_4$ is connected to its unit of rollers at an angle of $90+\Delta\alpha_2$, as measured clockwise from its axle axis. The angle $90+\Delta\alpha_2$ is effected in the preferred embodiment by holding the unit in a straight ahead position and connecting the free ends of $R_3$ and $R_4$ by an angle-determining link 53 having a length $L_2$ that is shorter than the lateral distance separating the respective units of rollers. This is analogous to the position of the radial arm 39D, FIG. 14; although in the opposite direction.

Similarly, the radial arm $R_5$ is connected with its unit of rollers at an angle greater than 90°, clockwise from its axle axis. The angle is effected by holding the unit in a straight ahead position and connecting the free ends of $R_4$ and $R_5$ via an angle-determining link 53 having a length $L_5$. The length $L_5$ will have been empirically determined and may be about the same as, or longer or shorter than, the lateral distance separating the respective units of rollers. Ordinarily, it will be slightly shorter, although this tendency may be compensated for by foreshortening of the arcuate movement of the free end of $R_4$, as discussed hereinafter with respect to FIG. 16. With symmetrical positioning of the units of rollers, $L_5$ will have about the same length as $L_4$ and $L_2$ will have about the same length as $L_3$.

Similar empirical and graphical analyses are carried out with respect to each row of rollers in the switching means.

The foregoing analysis has been found sufficiently accurate for engineeringly feasible construction. If desired for greater accuracy, a "relaxation method" can be employed by trial and error to work from the respective points of connection between the individual angle-determining linkages and the adjacent individual radial arms, such as illustrated in the top part of FIGS. 14 and 16. Moreover, the top part of FIG. 14 illustrates that the invention is operable whether the point of pivotal connection between the respective radial arms is toward or away from the fulcrum shaft 51 at which the master shifter lever 45 is pivoted. For example, if the radially outermost end of the respective arms were directed away from the fulcrum shaft 51, it would be moved toward the interior of the entry end of the switching means by some length to compensate for the radial arms pointing away from the fulcrum shaft 51. As indicated, the exact location of the fulcrum shaft 51 is best determined empirically for best overall results because of the vagaries of construction, such as imprecise welding of the respective supports of the frame that support the respective innermost units of rollers, imprecise drilling of the respective links and radial arms, the slack in the bearings in the rollers 27 and the like. For example, assume that a given unit of rollers is to be shifted through a lesser angle $\alpha_3$ than is the control radial arm 39E being shifted through an angle $\alpha_4$. The radially outermost end 55F of a radial arm 39F would be displaced at an angle $\beta$, or $90°+\Delta\alpha_4$ as described hereinbefore. This would require a linkage $d_3'$. Thus, this individual angle-determining link 53 would be longer than standard angle-determining link $d_1'$. Conversely, if the radially outermost end 55G of a radial arm 39G were to be displaced at a greater angle by movement of its point of connection 67 a distance $d_0$, it would be attached, or affixed, to the unit of rollers; as by being welded to the clevis supporting the unit of rollers; at an angle $\beta_1=90-\Delta\alpha_3$.

Figure 16:
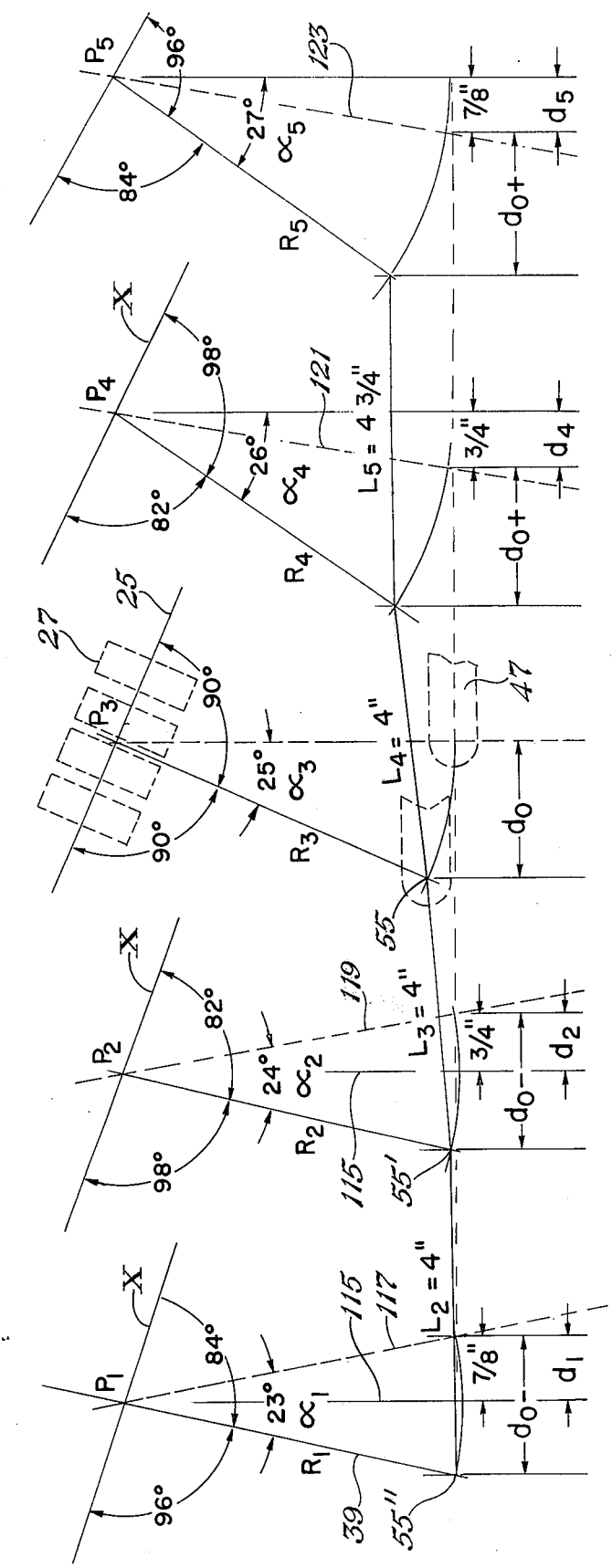
FIG. 16 is a plan schematic view showing a "relaxation method" of empirically determining the angle of attachment, or length of the angle-determining link.

The relaxation method of empirical determination can be understood more clearly by reference to FIG. 16 which diagrams one row of units 25, such as in FIGS. 13 and 15; selected for simplicity in explanation. Therein, the units 25 of rollers 27 are pivoted at points $P_1$, $P_2$, $P_3$, $P_4$ and $P_5$, with radial arms 39 designated $R_1$, $R_2$, $R_3$, $R_4$ and $R_5$, connected by angle-determining links $L_2$, $L_3$, $L_4$ and $L_5$. One of the angle-determining links is connected with the master row link 47. FIG. 16 illustrates the angle at which respective radial arms 39 will be attached to the axle axis X of respective units of rollers 27 in order to secure the desired angles of steer for the respective units of rollers and align their axle axes X with the line from common point 60, FIG. 10, not including any additional angle turned by the outer rows of units 25 of rollers 27 to offset for the drifting of articles travelling thereon at high speeds.

Assume the rigid master shifter lever 45 is being moved to the left a distance of $d_0$ to effect switching to the right, similar to FIG. 10. The master shifter lever 45 is connected with the central radial arm $R_3$ by master row link 47. The free end 55 of central radial arm $R_3$, designated as control and connected at an angle of 90° to the axle axis X, is moved to the left a distance $d_0$, pivoting the unit 25 of rollers 27 through an angular displacement of $\alpha_3$ (25°). However, radial arm $R_2$ must move through a lesser angular displacement of $\alpha_2$ (24°). Therefore, outer radial arm $R_2$ must be linked to outer radial arm $R_3$ by a length $L_3$ that is shorter by distance $d_2$ than the distance between the centers of the pivots $P_2$ and $P_3$. Thus, the transverse movement imparted to link $L_3$ by movement $d_0$ is reduced when transmitted to the free end 55 of $R_2$. In addition, the lateral component of the outer free end 55 of the radial arm $R_3$ as it revolves around pivot $P_3$ is reducing the lateral movement transmitted to the free end 55' of $R_2$. A first assumption without taking this additional reduction into effect will likely be erroneous and require another trial to "relax" the error build-up before proceeding to solve for the next length of angle-determining link.

Next, the length of $L_2$ must be developed for operating $R_1$ around the pivot $P_1$ to produce a smaller amount of angular rotation $\alpha_1$ (23°), since the Ackerman linkage cannot be compounded in a series of radial arms. In addition, the foreshortening at the two arcuately moving ends 55 and 55' must be compensated. Further in a practical embodiment as described hereinafter, extra turning, or steer, for $R_1$ must be added in to compensate for articles sliding outwardly when traversing the switch at high speed. Specifically, the free end 55' of $R_2$ will have been moved laterally a distance $d_0$ decreased by the distance $d_2$ and the arcuate movement of the free end 55 of radial arm $R_2$. A trial and error solution such as described hereinbefore will indicate that the distance $d_0$ must be decreased by a distance $d_1$. Expressed otherwise, the radial arm $R_1$ must have its free end 55" displaced a distance $d_1$ to the right of its center line 115, equivalent to the 90° position, in the straight ahead position of its unit 25 of rollers 27. As illustrated, $d_1$ is equal to ⅞ inch whereas $d_2$ is equal to ¾ inch. As can be seen in FIG. 16, the radial arms $R_1$ and $R_2$ will be positioned at the respective dashed lines 117 and 119, or at respective angles of 84° and 82° with respect to their X axes, in order to effect the desired and compensated different degrees of steer.

By converse empirical determination, the linkage $L_4$ connecting the outer free end of the radial arm $R_4$ with free end 55 of radial arm $R_3$, will be less by a distance $d_4$ than the lateral distance separating the centers $P_3$ and $P_4$. The length of the angle-determining link $L_4$ is the same as that of $L_3$. Specifically, the angle-determining link $L_4$ has the same length as $L_3$ in this symmetrical embodiment. Thus, the radial arm $R_4$ sits in the position shown by the dashed line 121 in the straight ahead position; or is connected with its angle axis X at an angle of 98°, the angle being measured in a clockwise direction from an axle axis X. In this way the unit of rollers at $P_4$ will be pivoted through an angle $\alpha_4$ (26°).

In similar analogy, after the length of the angle-determining link $L_4$ is determined to solve for its length and the pivotal movement of the free end of the radial arm $R_4$, a solution is made for the length of angle-determining link $L_5$ for effecting movement of the free end of the radial arm $R_5$, compensating for both the arcuate movement of the respective free ends of the arms $R_3$ and $R_4$, as well as the increasing angle of turn to effect the switching to the right. After a trial and error solution, it will be found that the distance $d_0$ must be increased by the distance $d_5$ so that the length of the angle-determining link $L_5$ is longer than $L_4$ by ¾ inch in order to effect the ⅞ inch increase in length because of the accumulative compensation. Thus, the unit of rollers at $P_5$ will be steered, or pivoted through an angle of $\alpha_5$ (27°) and the radial arm $R_5$ will be attached at an angle of 96° with respect to its axle axis X. The radial arm $R_5$ is positioned at the dashed line 123 in the straight ahead position in order to effect the angle of turn $\alpha_5$ (27°).

If there are more units of rollers in a given row, the same empirical analysis as described hereinbefore is continued until all of the arcuate movements are compensated for and the desired angle of steer, or pivotal movement, of the respective units of rollers is achieved by working from point to point in this relaxation method. The same graphical and empirical analyses are carried out with respect to each row of rollers in the switching means, regardless of the number of exit conveyors served. For example, the analysis may be complete for only three exits, such as illustrated in FIG. 15, or may operate to serve five exits; for example, ones 22½° to the left and to the right and respective ones 45° to the left and to the right, as well as the straight ahead position. When many different exits, such as the five exits, are employed, the degrees of pivotal movement of respective units of rollers outside of the path to be traversed by an article being switched onto a given exit conveyor is immaterial. Consequently, certain standard links may be employed as will become more clearly apparent from the descriptive matter hereinafter. As will be appreciated, the degree of steer of the rollers that never contact the article does not affect the path of travel of the article.

The master shifter lever 45 is a relatively high strength lever that is able to impart the desired lateral movement via the respective master row links 47. The master row links 47 are substantially uniform, as are the respective radial arms 39. Such standardization facilitates assembly and the differential steering is effected by the use of a plurality of respective angle-determining links 53 that are accorded an arbitrary designation, such as a letter of the alphabet, in accordance with its predetermined length. The assembly man simply interconnects the respective angle-determining links 53 in accordance with a predetermined table for the unit being manufactured.

A preferred method of preparing a conveyor switching means comprises the following steps. First, a frame is prepared with portions adapted for juxtaposing, or placing in respective end-to-end relationship with, an entering conveyor and a plurality of exit conveyors. The exit conveyors may include one that exits straight ahead and one at each of the predetermined angles in the desired direction; for example, one at 22½° to the left and one at 45° to the left in FIG. 1. The respective side rails of the frame have the desired radius of curvature from a radial center, such as the common point 60, FIG. 10. A plurality of a series of units of rollers are pivotally mounted on the top of the frame in rows and columns as illustrated. The series of units of rollers have substantially co-planar tops, or upper surfaces for supporting movement of articles over the frame, as described hereinbefore. The units of rollers are arranged in a first plurality of parallel rows and a second plurality of parallel columns. For example, the columns may be numbered on the left, as shown in FIG. 1, of columns 1 through 9. Similarly, the rows may be numbered progressively from the entering conveyor, or any other designated way, as illustrated by the numbers 1 through 23 on the top of FIG. 1. The respective units of rollers in a given row have a common axle axis in the straight ahead position. Although the units of rollers are pivotally mounted with respect to the frame, the axle apertures of the respective clevises are aligned by inserting a straight lineal member through their apertures when they are positioned in the straight ahead position; and are retained thusly until the radial arms 39 are connected to their respective clevises, as by welding, so as to pivot in unison, as described hereinafter. The master shifter lever 45 is pivotally mounted on its fulcrum shaft.

Next, a plurality of master row links 47 are pivotally connected with the master shifter lever 45 at predetermined respective radial distances from the fulcrum shaft 51, FIGS. 7 and 8. The other ends of the master row links 47 are left free for connecting with respective radial arms extending from respective units of rollers in a given row. The other ends of the master row links 47 may connect directly to the free ends 55 of respective radial arms; or to mid-points of respective angle-determining linkss 53, as illustrated in dashed lines in FIG. 4.

A plurality of respective radial arms will have been emplaced loosely on the respective units of rollers with their radially outermost, or free, ends extending toward their respective master row links. The radial arms in a column designated as the control column are connected with the clevises in the units of rollers at an angle of 90° with respect to the axle axes, and the radially outermost end of each control radial arm is pivotally connected with the free end of its master row link 47, per se, or via an angle-determining link 53.

Next, the predesignated individual angle-determining links, the respective critical lengths of which have been determined graphically and empirically as described hereinbefore, are interconnected between the radially outermost ends of the respective radial arms in the respective rows. A plurality of different standard lengths are employed in the individual angle-determining links; with the placement of the standardized links within a given array set forth in accordance with predetermined graphical and empirical determinations. It has been found advantageous to pivot the radially outermost units 25 of rollers 27 on a turn by an additional 3° or 4° in order to ensure that a package does not overrun because of inertia. Expressed otherwise, the unit of rollers comprising the radially outermost rollers in a turn, such as the units of rollers 93, FIG. 2, for effecting a turn through 22½° to the left, are arbitrarily pivoted through about 25½° instead of the 22½° that would ordinarily be necessary to effect a turn to 22½° to the left. Similarly, the units of rollers such as units 95 for effecting a turn through 45° to the left, will be rotated through about 49° instead of the theoretically accurate 45°. Similarly, all of the rollers lying along imaginary lines 97, FIG. 2, and 99, FIG. 3, will be arbitrarily pivoted the additional 3° or 4° in their extreme pivoted position to ensure the correct high speed movement of an article on top of the switching means onto the desired exit conveyor. An easy way of accomplishing the added steer, or turn, is to employ, instead of center 60, a pseudo center, or common point, 60A, FIG. 10, and align the respective axle axes with the respective radials therefrom. The pseudo center 60A may be located 4 to 10 inches, for example, 5 inches, from the center 60 toward the switching means. One such satisfactory arrangement incorporating these features is that set forth in Tables I and II hereinafter.

Table I delineates the row and column number and the arbitrary designations of the standard links that are to be emplaced intermediate the free ends of the radial arms in a particular row and column. Table II delineates the particular lengths for the arbitrary angle-determining links, based upon a column spacing of about 5 inches, row spacing of about 4 inches, and roller diameters of about 1⅞ inch. In the embodiment for which Tables I and II are good, namely, a switching device for switching to the left through both 22½° and 45° as illustrated in FIGS. 1–8, the respective units of rollers in column 5 comprise the control column.

Table I

| Column No. | | | | | | | | | Row No. |
|---|---|---|---|---|---|---|---|---|---|
| | | | | Control | | | | | |
| 1 | 2 | 3 | 4 | 5 | 6 | 7 | 8 | 9 | |
| | | | | | | | | | 22 |
| | | | | | | | | | 21 |
| | | | | ←—Z→ | | | | | 20 |
| | | | | ←—Z→ | | | | | 19 |
| | S← | | —Y→ | | | | | | 18 |
| | S | S | S | Q | T | | | | 17 |
| | S | S | S | P | T | | | | 16 |
| | Q | P | Q | O | S | | | | 15 |
| O | N | P | N | S | O | | | | 14 |
| | L | O | N | Q | P | | | | 13 |
| | I | M | M | P | Q | | | | 12 |
| G | L | M | O | S | | | | | 11 |
| | K | L | O | S | | | | | 10 |
| | I | K | N | S | S | | | | 9 |
| H | K | M | T | S | | | | | 8 |
| F | I | L | U | T | | | | | 7 |
| | I | L | U | U | | | | | 6 |
| | I | I | V | V | | | | | 5 |
| | H | I | V | V | | | | | 4 |
| | H | H | W | W | | | | | 3 |
| | H | G | W | W | | | | | 2 |
| | | | | | | | | | 1 |

Letters designate angle-determining links to be employed intermediate the pivotal connection points of the respective radial outer ends of respective radial arms on respective pivotally mounted units of rollers.

Table II

| Angle-determining link designation | Length (in.) |
|---|---|
| F | 4-1/8 |
| G | 4-3/16 |
| H | 4-1/4 |
| I | 4-5/16 |
| K | 4-3/8 |
| L | 4-7/16 |
| M | 4-1/2 |
| N | 4-9/16 |
| O | 4-5/8 |
| P | 4-11/16 |
| Q | 4-3/4 |
| S | 4-13/16 |
| T | 4-7/8 |
| U | 4-15/16 |
| V | 5 |
| W | 5-1/8 |
| Y | 14-7/16 |
| Z | 19-1/4 | in. —inches

The rollers beyond the 17th row, FIG. 1, of rollers will be pivoted through a standard predetermined angle, since they will be employed only for effecting a given movement. For example, the units of rollers on the 18th row and beyond will be rotated only through standard angles for effecting the movement onto the exit conveyors at 22½° and 45° to the left. Similarly, some of the units of rollers such as units 100 and 101, will be employed only for directing an article, respectively, 45° to the left and straight ahead and may be arbitrarily preset in at the requisite angle; such as, with their respective axle axes aligned with a radial from an arbitrary center of the turn, or common point. To effect the uniform shifting of those units of rollers which are to be pivoted, but pivoted through standard angles, an auxiliary shifter 102, FIGS. 7 and 8, is employed. The auxiliary shifter may comprise an auxiliary master shifter 103 that is pivotally mounted on the frame and has respective fixed links 105 that are fixedly connected therewith so as to rotate through the same angles, and in unison with the auxiliary shifter 103. One end of the auxiliary shifter 102 is connected with the rigid master shifter lever 45 through suitable link 105 and auxiliary link 107 in a bell crank arrangement illustrated most clearly in FIG. 8A. All of the units of rollers that will be shifted uniformly may have their respective radial arms connected with the auxiliary shifter 102 in similar bell crank arrangement, if desired. Expressed otherwise, the link 105 and the intermediate link 107 effect a standard and predetermined angle of movement, or rotation, of the auxiliary shifter 102 responsive to movement of the master shifter lever 55. The same angle and distance of movement of the radially outer ends of the links 105 are transmitted via intermediate linkages 109 to the respective pivotally connected radial arms 111, that are the same as those designated 39 when connected with the master shifter lever 45. All radial arms 111 are welded at 90° to the axis axes of the units of rollers.

In operation, the master shifter lever 45 is shifted to an arbitrary position; for example, to the 45°-to-the-left position. The respective units of rollers are pivoted such that their axle axes align with respective radials from a common center 60, FIG. 10, except for the radially outermost units of rollers which are arbitrarily rotated through an additional angle somewhere between 3° to 10°, for example, about 3°–4°. This additional rotation may be effected by the graphical and empirical determination described hereinbefore and carried out with respect to aligning the axle axes with radials from pseudo-center 60A as to the positioning of the radial arm onto the respective clevis of the unit of rollers before it is fixedly attached, as by welding.

In the illustrated embodiment, the master shifter lever 45 is moved responsive to closure of a suitable switch (not shown) in a circuit in which the predesignated limit switch is also incorporated. For example, a predetermined switch would effect a switch of 22½° to the left and have the limit switch 89 for that degree of movement incorporated into its circuit. Consequently, when the master shifter lever has been moved to the predetermined position for effective 22½° movement to the left, the limit switch 89 will be effectively operated to stop further movement of the master shifter lever 45. If, on the other hand, another switch and circuit employing the limit switch 91 for effecting 45° movement to the left, the commensurate amount of movement for effecting a 45° movement to the left will be effected and the master shifter lever 45 will be stopped upon operation of the limit switch 91. In any event, the effective units of rollers will be pivoted through their angle of movement to direct an entering object onto the desired exit conveyor. For example, the units of rollers will be pivoted as shown in FIG. 2 to direct an article onto the 22½° exit conveyor; or as shown in FIG. 3 to direct an object onto the 45° exit conveyor.

In FIG. 2, the rollers within the area bounded by lines 97, 97B, 97A and 19 move into the same 22½° pivot configuration for switching an article onto a 22½° left exit conveyor. In FIG. 3, the rollers within the area bounded by lines 99, 99A, 15 and 21 move into the same 45° pivot configuration for switching an article onto a 45° left exit conveyor.

Thus, a desired system of any complexity and responsive to one, a plurality of, or a master control can be built up by combining of conventional units with the switching device of this invention.

The major problem and the greater plurality of linkages is required with unsymmetrical shifting, such as illustrated in FIGS. 1–3. The same principle can be employed more easily in symmetrical switching means, such as illustrated in FIG. 15. Therein, the central column 113 is designated as the control column and only two columns of units of rollers on either side need be connected via respective radial arms, angle-determining links and master row links with the master shifter lever (not shown) so as to effect the desired differential stearing. Table III summarizes the interconnecting, angle-determining links intermediate the respective ends of the radial arms in the respective rows and columns for the embodiment of FIG. 15. The embodiment of FIG. 15 can be easily modified to provide for shifting at any predetermined angle or angles; for example, both 22½° and 45°; in both directions; with or without a straight ahead option.

Table IV contains the length of the respective angle-determining links for the embodiment of FIG. 15, similarly as Table II did for the embodiment of FIG. 1.

Table III

| Column No. | | | | | Row No. |
|---|---|---|---|---|---|
| 1 | 2 | 3 | 4 | 5 | |
| | ←9-5/8"→ | | ←9-5/8"→ | | 17 |
| | | | | | 16 |
| M | N | N | | M | 15 |
| M | N | N | | M | 14 |
| M | N | N | | M | 13 |
| L | M | M | | L | 12 |
| L | L | L | | L | 11 |
| L | K | K | | L | 10 |
| L | J | J | | L | 9 |
| L | J | J | | L | 8 |
| L | I' | I' | | L | 7 |
| K | I' | I' | | K | 6 |
| K | H' | H' | | K | 5 |
| K | G | G | | K | 4 |
| J | G | G | | J | 3 |
| J | D | D | | J | 2 |
| J | C | C | | J | 1 |

Table IV

| Angle-determining link designation | Length (in.) |
|---|---|
| C | 4-1/32 |
| D | 4-1/16 |
| G | 4-1/8 |
| H' | 4-3/16 |
| I' | 4-1/4 |
| J | 4-5/16 |
| K | 4-3/8 |
| L | 4-7/16 |
| M | 4-1/2 |
| N | 4-9/16 |

Table IV includes dimensions for the embodiment of FIG. 15 employing substantially the same row and column spacing and the same size units of rollers and radial arms as described hereinbefore with respect to Table II.

The respective units of rollers may be pivotally mounted on the top by any desirable means; for example, a bolt may penetrate through the top supporting the roller and be connected with the clevis of the unit of rollers so as to rotate in unison. When such structure is employed, it facilitates the attachment of a radial arm below the top on which the units of rollers are employed and facilitates an interconnection with the respective master row links 47 and master shifter lever 45.

This invention has the capability of accommodating the structure in which it will be placed, for example, allowing clearance around a column in a building. Specifically, the holes in the rigid master shifter lever 45 need not be spaced evenly, but can accommodate whatever spacing is necessary. One or several rows of columns of units of rollers in a given switching means may be over turned or under turned as required by the space limitations. Likewise, suitable turns can be made by having the master shifting lever itself shaped to accommodate the structure or different lengths of master row links 47.

If desired, the master shifter lever 45, or any one of the links can be adapted to increase or decrease the action required; for example, it can be formed as a walking beam or the like to magnify or decrease lateral motion as necessary and as noted hereinafter.

The master shifter lever is shifted to the right or to the left at the desired position to effect a 45° movement in either direction in the embodiment of fIG. 15 by suitable moving means, such as moving means 49 illustrated in FIG. 7. Other rapidly moving means that are practical include pneumatically operable means and electro-mechanical means that operate responsive to a solenoid or relay to a predetermined position. It is preferred that any moving means that is employed have an adjustment that will allow adjusting the degree of pivotal movement, either pivotal lever movement or pivotal rotation movement, of the master shifter lever to compensate for the skidding tendency of objects moving rapidly over the switching means. This adjustment is readily provided in the embodiment described hereinbefore by the simple expedient of moving the limit switches.

If desired, locking means may be provided for locking the master shifter lever at the desired position. In the moving means illustrated, however, the fluid in the powered ram provides suitable locking means, particularly if the fluid is a liquid that provides a liquid block.

Although laterally extending members 23 and bent radial arms have been illustrated as the most advantageous frame top and radial arm combination, the switching means may employ any suitable top that will adequately support the column and rows of pivotally mounted units of rollers in combination with any type of radial arms that will allow the connected radial arms to be connected, ultimately, with the master shifter lever and operate, above or below the top, in such a way as to effect the different degrees of pivotal movement, or steer, of the respective units of rollers in both columns and rows.

In fact, any means that will effect the different degrees of pivotal movement, or steer, of the respective units of rollers in both columns and rows may be employed in this invention. Any combination of structure and levers that will effect the increasing amounts of lateral movement longitudinally along the master shifter lever may be employed as the master shifter lever and the respective master row links for moving the respective free ends of the radial arms. For example, a rotatable rod, such as the auxiliary master shifter 103, may be journalled in mounts for pivotal rotation, as illustrated in FIG. 8A, and have the respective master row links connected with the master shifter lever by respective radially extending links that are similar to the links 105, FIG. 8A. As shown in dashed lines 129, FIG. 8A, the radially extending links will have increasing lengths as their distances from the first end of the master shifter lever increases, the first end being adjacent the entry end of the frame of the switching means. Each of such radially extending links are fixedly connected to the master shifter lever so as to rotate in unison therewith and to move their respective outer ends through arcs that effect lateral movement as the master shifter lever is pivoted, or pivotally rotated. As illustrated, the radially extending links have their respective outer ends pivotally connected with respective master row links for effecting the respective and various amounts of lateral movement that increase as the distance longitudinally of the master shifter lever increases for thereby effecting the different degrees of steer of the respective units of rollers in the respective columns. The respective different degrees of steer of the respective units of rollers in a given row is then effected via interconnection between the radial arms and the master shifter lever or its equivalent. For example, there may be a plurality of master row links that are connected with the master shifter lever and connect to respective radial arms directly such that there are no angle-determining links employed. Even when the angle-determining links are employed, the respective radial arms may have two or more holes at their free end such that the respective angle-determining links can be connected to a radially interior hole and the next adjacent angle-determining link connected with a radially exterior hole at the free end of the respective radial arm. As indicated hereinbefore, this effectively alters the length of the radial arm transmitting the lateral movement to an adjacent radial arm and may be employed in this invention. Moreover, the radial arms that have been illustrated extending substantially normally to the axle axis of respective units of rollers may, in fact, be parallel with the axle axes of the respective units of rollers and respective means employed to effect the different degress of steer in both rows and columns.

Of course, a wide variety of different approaches may be employed for pivotally connecting the ends of the respective links; and linkages are applicable as appropriate to the other apparatus employed.

The switching means is self-contained and unitary. It may be made part of a permanent conveyor installation but is light enough to be employed with portable conveyor sections. It can be supported from conventional conveyor supports or have its own support system so as to be rolled from one location to another.

From the foregoing, it can be seen that this invention provides the objects delineated hereinbefore. Specifically, the switching means of this invention provides the features delineated hereinbefore as desirable, and not heretofore provided, and operates as follows. When the master shifter lever is in the straight ahead position, for example, parallel with the longitudinal axis of the straight run, the units 25 of rollers 27 wili lie with their axle axes perpendicular to that longitudinal axis of the straight run and will be disposed so as to carry an article supported by them over the frame in a straight away direction and in line with its longitudinal axis, as illustrated in FIG. 1. By shifting the lever to the right to the first limit switch 89, the axes of the swivel rollers will be shifted to deflect the articles to the left at 22½°. By reason of the differential pivoting, or steering, given the units of rollers in each row, coupled with the greater degree of pivotal movement of the respective rows disposed radially outwardly along the master shifter lever 45, illustrated most graphically in FIG. 8, the respective units of rollers are shifited so as to bring their axle axes into alignment with lines from the common center. As a result, an article received by the inlet conveyor at front frame member 11 will be directed to the 22½° section 19 and onto the exit conveyor located thereat. The additional 3°–4° pivotal movement given the outside rollers along the radially outermost radius of curvature of the 22½° shift will also ensure that the article may be moved rapidly, yet resist the tendency to overrun because of inertia. In like manner, the master shifter lever 45 is shifted all the way to the right to effect a switching of an article onto the conveyor disposed at 45° to the left. Here again, the respective differential degrees of steer, or pivotal movement is effected as a result of both the additional degrees of steer effected by greater lateral movement of the lever radially outwardly from the fulcrum shaft 51 in combination with the greater degress of steer, analogous to the Ackerman steering as described hereinbefore, effected by the respective individual angle-determining links in each row of units of rollers. Thus, an article may be readily transferred to the desired degree of switching to the left in FIG. 3. In like manner, a switching means may be provided for switching articles to the right by providing a mirror image construction of that described with respect to FIGS. 1–8 hereinbefore. On the other hand, a single unit such as described with respect to FIG. 15 may be provided for shifting either to the right or to the left but having symmetrical construction and shifting either 22½° or 45° to either the right or the left.

Although this invention has been described with a certain degree of particularity, it is understood that the present disclosure is made only by way of example and that numerous changes in the details of construction and the combination and arrangement of parts may be resorted to without departing from the spirit and the scope of this invention.

What is claimed is:

1. A conveyor switching means for conveying freight or the like from an entering conveyor to a predetermined one of a plurality of exit conveyors disposed at respective angles in respective directions comprising:
   a. a frame with entry and exit ends adapted for juxtaposing in respective end-to-end relationship with an entering conveyor and a plurality of exit conveyors, including one at each predetermined angle in the desired direction;
   b. a series of units of rollers for support and movement of an article over said frame; said rollers being arranged in a first plurality of rows and a second plurality of columns; one of said columns of rollers being a control column and having respective control units of rollers in each of said rows; each of said units of rollers having at least one roller having a common axle axis and being mounted in a member that is pivotally carried by said frame; and
   c. shifting means for shifting the axes of said units of rollers so as to control the direction of movement of an article delivered to said switching means from an entering conveyor and cause said article to exit selectively on one of said exit conveyors; said shifting means including:
      i. a rigid master shifter lever pivotally mounted via a fulcrum shaft adjacent said entry end of said frame;
      ii. a plurality of rigid master row links for respective rows of said units of rollers; said master row links being pivotally connected with said master shifter lever at predetermined respective radial distances from said fulcrum shaft;
      iii. a plurality of respective rigid radial arms having their radially outer ends pivotally connected with respective master row links; said radial arms being proportioned and affixed to said units of rollers so as to align said respective axle axes of said units of rollers with respective lateral straight lines in straight ahead positions and with respective radials passing from a common radial center through the respective centers of said units of rollers in respective switching positions so as to effect different degrees of pivoting of said units of rollers in both said columns and said rows in being moved to said switching positions; and
      iv. moving means for moving said master shifter lever about its fulcrum shaft.

2. The switching means of claim 1 wherein said plurality of radial arms have the same length and have their said radially outer ends connected with respective master row links via a plurality of respective predetermined rigid angle-determining links of respective predetermined lengths; and respective said radial arms are connected with their respective units or rollers at respective predetermined angles with respect to respective said axle axes and effect interconnection with respective said master row links via respective said predetermined individual rigid angle-determining links; said master row links being pivotally connected with said radial arms of said units of rollers in said control column and said radial arms in said control column are affixed at said predetermined angle of 90° when said units of rollers and said master shifter lever are in the straight ahead position; said predetermined rigid angle-determining links providing the flexibility of different distances of movement of the pivotally mounted ends of said radial arms without buckling of said links and without interference with the movement of other radial arms.

3. The switching means of claim 2 wherein a plurality of said predetermined rigid angle-determining links of varying lengths each comprise a plurality of individual rigid angle-determining links connected serially with respective pivotally mounted ends of respective radial arms extending laterally along respective rows from said control units of rollers in said control column.

4. The switching means of claim 1 wherein said rows are parallel and said columns are parallel.

5. A conveyor switching means for conveying freight or the like from an entering conveyor to a predetermined one of a plurality of exit conveyors disposed at respective angles in respective directions comprising:
   a. a frame with entry and exit ends adapted for justaposing in respective end-to-end relationship with an entering conveyor and a plurality of exit conveyors, including one at each predetermined angle in the desired direction;

b. a series of units of rollers for support and movement of an article over said frame; said rollers being arranged in a first plurality of rows and a second plurality of columns; one of said columns of rollers being a control column and having respective control units of rollers in each of said rows; each of said units of rollers having at least one roller having a common axle axis and being mounted in a member that is pivotally carried by said frame; and c. shifting means for shifting the axes of said units of rollers so as to control the direction of movement of an article delivered to said switching means from an entering conveyor and cause said article to exit selectively on one of said exit conveyors; said shifting means including:

i. a rigid master shifter lever pivotally carried by said frame and adapted to impart when pivoted amounts of lateral movement that increase as the distances longitudinally of said master shifter lever increases from its first end adjacent said entry end of said frame;

ii. a plurality of rigid master row links for respective rows of said units of rollers; said master row links being pivotally connected with said master shifter lever at predetermined respective said distances longitudinally of said master shifter lever from said first end;

iii. a plurality of respective rigid radial arms having their radially outer ends pivotally connected with respective master row links; said radial arms being proportioned and affiixed to said units of rollers so as to align said respective axle axes of said units of rollers with respective lateral straight lines in straight ahead positions and with respective radials passing from a common radial center through the respective centers of said units of rollers in respective switching positions so as to effect different degrees of pivoting of said units of rollers in both said columns and said rows in being moved to said switching positions; and iv. moving means for pivoting said master shifter lever.

6. The switching means of claim 5 wherein said plurality of radial arms have the same length and have their said radially outer ends connected with respective master row links via a plurality of respective predetermined rigid angle-determining links of respective predetermined lengths; and respective said radial arms are connected with their respective units of rollers at respective predetermined angles with respect to respective said axle axes and effect interconnection with respective said master row links via respective said predetermined individual rigid angle-determining links; said master row links being pivotally connected with said radial arms of said units of rollers in said control column and said radial arms in said control column are affixed at said predetermined angle of 90° when said units of rollers and said master shifter lever are in the straight ahead position; said predetermined rigid angle-determining links providing the flexibility of different distances of movement of the pivotally mounted ends of said radial arm without buckling of said links and without interference with the movement of other radial arms.

7. The switching means of claim 6 wherein a plurality of said predetermined rigid angle-determining links of varying lengths each comprise a plurality of individual rigid angle-determining links connected serially with respective pivotally mounted ends of respective arms extending laterally along respective rows from said control units of rollers in said control column.

8. The switching means of claim 5 wherein said master shifter lever is journalled in mounts for pivotal rotation and said master row links are connected with said master shifter lever via respective radially extending links; said radially extending links having increasing lengths with increasing distances longitudinally of said master shifter lever from its said first end and being fixedly connected to said master shifter lever so as to move their respective outer ends through arcs effecting said respective various amounts of lateral movement as said master shifter lever is pivotally rotated; said radially extending links having their respective said outer ends pivotally connected with respective master row links for effecting the said respective various amounts of lateral movement and, in combination with said rigid radial arms and their respective angles of attachment to said units of rollers, the different degrees of pivoting of said units of rollers in both said columns and rows in operation.

9. A conveyor switching system for conveying freight or the like from an entering conveyor to a predetermined one of a plurality of exit conveyors disposed at respective predetermined angles in respective directions comprising:

a. a frame with entry and exit ends adapted for juxtaposing in respective end-to-end relationship with an entering conveyor and a plurality of exit conveyors, including one at each said predetermined angle in the desired direction;

b. a series of units of rollers for support and movement of an article over said frame; said rollers being arranged in a first plurality of rows and a second plurality of columns; each said units of rollers having at least one roller having a common axle axis and being mounted in a member that is carried by said frame so as to be pivotally movable about a pivot axis running therethrough and defined at a predetermined spot with respect to said frame; and c. shifting means for shifting the axle axes of said units of rollers by pivoting respective said members about respective pivot axes at said predetermined spots so as to control the direction of movement of an article delivered to said switching means from an entering conveyor and cause said article to exit selectively on one of said exit conveyors; said shifting means including respective radial arms rigidly attached to respective units of rollers with free ends extending radially outwardly from said pivotal axes of said units of rollers; and first means for effecting respective amounts of movement of said free ends of said radial arms; said radial arms being attached to said respective units of rollers at respective predetermined attachment angles α with respect to the respective axle axes of said units of rollers such that the length of said radial arm in combination with said respective amounts of movement of said free ends of said radial arms pivot said units of rollers through respective degrees about their respective said pivot axes to effect alignment of the respective axle axis of each said unit rollers with respective lateral straight lines when said system is disposed in a straight ahead position and with respective radials passing from a common center through the respective centers of said units of rollers when said system is disposed in respective switching positions so as to effect different degrees of pivoting of said units of rollers in both said columns and said rows when said units of rollers are pivoted to their said switching positions.

10. A method of manufacturing a conveyor switching means for conveying freight or the like from an entering conveyor to a predetermined one of a plurality of exit conveyors disposed at respective angles in respective directions comprising:

a. preparing a frame with entry and exit ends adapted for juxtaposing in respective end-to-end relationship with an entering conveyor and a plurality of exit conveyors;

b. pivotally mounting a series of units of rollers on top of said frame; said series of units of rollers having the tops of their rollers substantially co-planar with support and movement of articles over said frame; said units of rollers being arranged in a first plurality of parallel rows and a second plurality of parallel columns; one of said columns of rollers being a control column and having control units of rollers in each of said parallel rows; each of said units of rollers having at least one roller having a common axle axis and being mounted in a clevis member pivotally carried by said frame; said pivotally mounting of said units of rollers comprising aligning said units of rollers by inserting a straight lineal member through apertures in said clevis member in which are finally mounted axles on which rollers are rotatably carried to ensure that said units in said rows are axially aligned with said units in said control column in the straight ahead position; and thereafter removing said lineal member and mounting said respective axles and rollers in said units;

c. emplacing on said frame and pivotally connecting with respective said units of rollers a shifting means; said shifting means including: respective radial arms on respective units of rollers with free ends extending radially outwardly from said units of rollers, and first means for effecting respective amounts of movement of said free ends of said radial arms; fixedly attaching said radial arms to respective said units of rollers such that the length of said radial arms in combination with said respective amounts of movement of said free ends of said radial arms effect alignment of respective axle axes of said units of rollers with respective lateral straight lines in their straight ahead positions and with respective radials passing from a common center through the respective centers of said units of rollers in respective switching positions so as to effect different degrees of pivoting of said units of rollers in both said columns and said rows in being moved to said switching positions; said fixedly attaching of said radial arms to respective said units of rollers being carried out before said lineal member of step b. is removed and said rollers are mounted on said axles in respective units of rollers; whereby the requisite differential pivoting of the units of rollers in both columns and rows is effected to successfully convey an article from an entering conveyor to the desired exit conveyor by the simple expedient of moving said master shifter lever.

11. The method of claim 10 wherein said emplacing on said frame and pivotally connecting of said shifting means with said respective units of rollers comprises the steps of:

a. pivotally mounting a master shifter lever on said frame with a first end of said master shifter lever adjacent said entry end of said frame;

b. pivotally connecting a plurality of master row links with said master shifter lever at predetermined respective distances from said first end for connecting with radial arms extending from respective said units of rollers;

c. designating one column of said units of rollers as a control column and fixedly connecting the respective control radial arms to respective said units of rollers in said control column at 90° with respect to the axle axis and pivotally connecting said control radial arms with respective master row links; said radial arms being connected with respective said units of rollers at respective predetermined angles such that pivotal movement of said master shifter lever will effect the respective amounts of movements of said free ends of said radial arms and effect the different degrees of pivoting of said respective units of rollers in both said columns and rows in being moved to said switching positions.

12. The method of claim 11 wherein said respective radial arms have the same length and the step of connecting their free ends with respective master row links comprises the steps of:

a. emplacing and pivotally connecting a plurality of respective individual angle-determining links of respective predetermined lengths to respective said free ends of said radial arms and to the next adjacent said free end of respective radial arms laterally toward said control radial arm such that all free ends are ultimately connected with said master row links and are free to move the correct distance and angle to effect differential degrees of pivoting of said units of rollers in both said columns and said rows in being moved to their switching positions so as to align respective said axle axes of said units of rollers with respective radials passing from a common radial center through the centers of respective said units of rollers; and b. setting said rows of units and said master shifter lever in the straight ahead position and permanently affixing respective said radial arms to respective said units of rollers at the resulting predetermined angles;

whereby the requisite differential pivoting of the units of rollers is effected to successfully convey an article from an entering conveyor to the desired exit conveyor by the simple expedient of moving said master shifter lever.

13. The method of claim 12 wherein the outside rows of said units of rollers are affixed at said predetermined angles with respect to their radial arms so as to align respective axle axes in said switching positions with a second common point and thereby to effect an additional degree of turn in the range of 1°–10° greater angle than said radial from said common radial center.

14. The method of claim 11 wherein said predetermined lengths and arrangement of said angle-determining links are determined graphically and empirically beginning with said radial arm on said units of rollers in said control column and extending therefrom laterally along respective rows; the lengths and, consequently, the predetermined angle being such that each said unit will be rotated sufficiently to have its said axle axis aligned with a respective radial extending from a predetermined common radial center through the center of said unit of rollers at the position of said master shifter lever corresponding to the respective predetermined angle of the exit conveyor with respect to the straight ahead axis of said switch means.

* * * * *